United States Patent Office 3,042,530
Patented July 3, 1962

3,042,530
SHORTENING EMULSIFIER AND METHOD FOR PREPARING THE SAME
David P. Kidger, Glen Rock, N.J., assignor to Swift & Company, Chicago, Ill., a corporation of Illinois
No Drawing. Filed Jan. 16, 1959, Ser. No. 787,136
13 Claims. (Cl. 99—118)

This invention relates to shortening compositions and to a method for the production of improved shortening materials in addition to the provision of a novel shortening additive.

In the manufacture of bakery and confectionery products, shortenings of the compound or blended type and all hydrogenated shortenings may be employed. All hydrogenated shortenings may be further classified as general purpose, biscuit and cracker type, and superglycerinated shortenings. For a given use, such as in cake baking, frying, cracker manufacture, etc., different types of shortening products having distinctive functional properties particularly well-adapted to the area of use are employed. For general bakeshop, hotel and restaurant use, general purpose shortening may be employed, while superglycerinated shortenings are particularly effective in cakes, yeast raised doughs and similar baked goods. The shortening compositions of the present invention, while they possess functional properties in other areas of the baking industry, are particularly useful and provide unobvious benefits in the preparation of icings and cream fillers.

Icings for pastry products are prepared from a mixture of powdered sugar, milk or water, flavoring materials, and shortening, the mixture being beaten to incorporate air into the icing. These icing or cream filler compositions may be placed between layers of cake or incorporated within a pastry product, in which case the materials are referred to as cream fillers rather than icings, which are generally placed on the surface of the bakery product. The appearance, texture, and volume of cream fillers are important factors in evaluating such products. These characteristics of the product will be affected to a great degree by the shortening agent employed in the preparation of the cream filler. It has been found, for instance, that the absence or presence of an emulsifier in the shortening composition may mean the difference between a satisfactory or unsatisfactory icing or cream filler. The emulsifier component of such compositions is, therefore, most important.

It is an object of the present invention to provide an improved shortening additive which imparts to a shortening agent characteristics rendering such shortening agent particularly well adapted to use in the preparation of icings and cream fillers.

Another object of the invention is the provision of an icing or cream filler shortening composition which when employed in the preparation of cream icings provides a smoother, more structurally stable icing than those previously known. Such a cream filler will have both a low specific gravity and a body which is stable to mechanical working and handling.

Additional objects, if not specifically set forth herein, will be readily apparent from the detailed description which follows.

In general, the present invention contemplates a cream filler shortening composition comprising a shortening agent containing a small quantity of the reaction product derived from the reaction between a monohydroxy polycarboxylic acid, an aliphatic polyol (polyhydric alcohol) and a composition containing as an essential component thereof a partial ester of a polyhydric alcohol and a higher fatty acid, said ester having at least one and preferably two free hydroxyl groups. The reaction is conducted in a closed vessel by heating the reactants with stirring in a vacuum, or at atmospheric pressure blanketing the reaction mixture with carbon dioxide or other inert gas. The inert gas is employed to remove water which is split off in the reaction, to prevent oxidative deterioration, and to inhibit discoloration of the reaction product. Some volatile, low molecular weight, organic compounds are removed with the water. The reaction product is a homogeneous, viscous, light-colored liquid which is then subjected to a deodorization process wherein volatile materials are stripped from the product by steam-stripping under vacuum.

The preferred additive is prepared by reacting equimolar amounts of citric acid, propylene glycol and higher fatty acid monoglycerides. The reaction is carried out by heating the reactants gradually to a temperature of around 180° C., while agitating and blanketing the mixture with an inert gas. Increased yields through more efficient utilization of the propylene glycol can be accomplished through the use of a condenser system which will preferentially condense the propylene glycol and other volatile, low molecular weight materials, but not water vapor, and return them to the reaction mixture. Such a condenser arrangement would be operative for either vacuum or atmospheric conditions, where the latter utilizes a moving blanket of an inert gas. While commercial monoglycerides may be employed as the monoglyceride component in the reaction mixture, a more functional product results when the monoglyceride content is increased by using a substantially pure monoglyceride. Commercial monoglycerides normally contain approximately 45% mono fatty acid esters of glycerine, approximately 45% of di-fatty aicd esters of glycerine, and approximately 10% triglycerides. These materials are prepared by reacting either fatty acids or a fat with an excess of glycerol using the methods of esterification or interesterification respectively.

Recently more highly purified monoglycerides have become available. These materials which contain 90–95% monofatty acid esters of glycerine, are derived from monoglyceride, diglyceride, triglyceride mixtures by refining or by distillation. When the substantially pure monoglycerides are employed as the monoglyceride reactant in the present reaction, the additive is approximately twice as active as a similar composition wherein commercial monoglycerides are employed as the monoglyceride reactant in the reaction.

The improved shortening agent contemplated by this invention in general utilizes all the products resulting from the esterification of polyhydric alcohols with hydroxy polycarboxylic acids and higher fatty acid monoglycerides. The effect of improved emulsification described herein, will not necessarily be the same for all compounds resulting from reaction of hydroxy-polybasic acids and polyhydric alcohols. However, they will all have some effect on the icing and cream filler properties of the shortenings in which they are contained. Optimum functionality will be obtained from those compounds having the proper balance of functional groups which result from esterification to give alkyl substituent groupings of the mono or polyesters. The reactants for the preparation of this emulsifier may not be restricted to their free acid or alcoholic forms and can, in the case of the polyols, be used as the inner ether or other anhydride. The acids, too, can be used as their lower alkyl esters in which case the lower alcohol is eliminated by interesterification with the polyhydric alcohol.

The choice of polyol and hydroxy polycarboxylic acid, or their derivatives, must of course be governed by a consideration of edibility and the solubility characteristics necessary to be compatible with the system into which the condensed product is incorporated. To those skilled in the art, it is obvious that a variety of products of varying hydrophilic-lipophilic balance are possible from the reaction of these materials. The hardness of the fatty acid monoglyceride as indicated by its iodine value, will also affect the physical properties of the finished emulsifier and can therefore be adjusted to suit the contemplated system. While the specific embodiments set out hereafter are directed to edible products, it can be seen that there is a possibility for the formation of a large number of products having surfactant properties which would be useful for systems not necessarily classed as edible, where water-fat soluble characteristics are required.

The following examples show the preparation of an additive for commercial use in edible shortening compositions. The choice of reactants was determined by the relative availability, cost and acceptability for use in a food product.

EXAMPLE I

One mole anhydrous citric acid (192 g.) was dissolved in 6.6 mols propylene glycol (500 g.) by heating to 60° C. with agitation. When the citric acid was substantially dissolved in the glycol, one mole of monoglyceride concentrate (360 g. of 90–95% monoester) was added, and the mixture heated slowly under a moving blanket of carbon dioxide. The glass reaction vessel was fitted with a thermometer, stirrer and air reflux condenser. After two hours and forty-five minutes of gradual heating, the temperature had reached 177° C., and a small amount of distillate had passed through the air condenser. The distillate was condensed with water cooling and collected. The product was then cooled and the cooled reaction mixture subjected to deodorization by heating to 105° C. under a vacuum of 1 mm. for 30 minutes. The product was a slightly cloudy, viscous, light-colored liquid.

EXAMPLE II

Equimolecular quantities of anhydrous citric acid (192 g.) and propylene glycol (76 g.) were heated with stirring at 60° C. to effect complete solution of the solid acid. One mole of monoester (93% monoester concentrate of lard monoglycerides I.V. of 40) (360 g.) was added and the temperature raised to 170° C. keeping the reaction mixture under a moving blanket of carbon dioxide. The reaction vessel is also fitted with a condenser, the temperature of which is adjusted so that the propylene glycol will be condensed and returned to the reaction allowing the water of reaction to be removed by the effluent gas. The mixture was cooled after a reaction period of approximately 3 hours at which time 3 moles (54 g.) of water had been collected. The product was steam stripped under reduced pressure of 1 mm. for 30 minutes at 110° C.

EXAMPLE III

One mole (360 g.) of a monoglyceride concentrate (93% monoester content with I.V. of 40) prepared from lard was added to a solution of citric acid monohydrate (210 g.) in 3 moles of propylene glycol (228 g.). The mixture was heated with stirring under a blanket of carbon dioxide at 180° C. for a period of 2 hours and 15 minutes or until approximately 80 grams of water and excess glycol had been distilled off. The reaction vessel was fitted with a reflux condenser which preferentially returned a large portion of the glycol vaporized during the reaction period. The cooled reaction product was washed with an equal weight of distilled water, separated by centrifugation and steam stripped under a reduced pressure of 1 mm. at 105° C. for 30 minutes.

EXAMPLE IV

For the purpose of illustrating the effectiveness of the preparations described in Examples I, II and III, the following test in a high-fat cream filler is included. Table I shows specific gravity data for typical shortening compositions containing an effective level of the emulsifier preparations. The cream filler formula used contained:

1 lb. 7½ oz. shortening
2 lb. 2 oz. powdered sugar
5⅞ oz. non-fat milk solids
⅛ oz. salt
8¾ oz. marshmallow
1 lb. 4 oz. water
¼ oz. vanilla Table I

| Shortening Agent | Specific Gravity | | | Body |
|---|---|---|---|---|
| | 15 Min. | 20 Min. | 25 Min. | |
| Meat Fat Shortening containing 5% Monoglycerides | .570 | .535 | .515 | Fair. |
| Meat Fat Shortening containing 4% Composition of Ex. I | .425 | .410 | .405 | Good. |
| Meat Fat Shortening containing 4% Composition of Ex. II | .410 | .390 | .390 | Good. |
| Animal and Veg. Shortening containing 4% Composition of Ex. III | .425 | .405 | .405 | Good. |

EXAMPLE V

The functionality of the products described above (Examples I, II and III) are equally good in low-fat cream filler formulations. Table II gives the results when these emulsifier preparations are used at effective levels in a cream filler having the following formulation:

1800 grams powdered sugar
720 grams shortening
18¾ grams salt
22½ grams vanilla
300 grams cornstarch
570 grams water
11¼ grams gelatin Table II

| | Specific Gravity | | Body |
|---|---|---|---|
| | 32 Min. | 37 Min. | |
| Meat Fat Shortening plus 5% monoglycerides | .710 | .705 | Fair. |
| Meat Fat Shortening plus 1% Ex. I | .585 | .585 | Good. |
| Meat Fat Shortening plus 2% Ex. I | .595 | .595 | Good. |
| Meat Fat Shortening plus 4% Ex. I | .600 | .595 | Excellent. |
| Meat Fat Shortening plus 6% Ex. I | .615 | .600 | Very Good. |

EXAMPLE VI

One mole (360 g.) of a monoglyceride concentrate (93% monoester content with I.V. of 60) was added to a solution of 150 g. tartaric acid dissolved in 3 moles of trimethylene glycol (228 g.). The mixture was heated with stirring under a blanket of carbon dioxide at 180° C. for a period of 2 hours and 15 minutes. The reaction vessel was then fitted with a reflux condenser which was adapted to return the major amount of the vaporized glycol to the reaction mixture while removing water. After cooling of the reaction mixture the product was washed with an equal weight of distilled water, centrifuged, and steam stripped under a vacuum of about 1 mm. and temperature of 110° C.

EXAMPLE VII

Equimolar quantities of maleic acid (134 g.), butylene glycol (90 g.), and a hydrogenated cottonseed oil monoglyceride concentrate (93% monoester with I.V. of 90) were admixed and the mixture was heated with stirring under a blanket of carbon dioxide at a temperature of 170–180° C. for a period of about 2 hours and 30 minutes. The reaction product after cooling was washed with distilled water, separated by centrifugation, and steam stripped for about 30 minutes under a vacuum of 1 mm. and a temperature of 100–110° C.

EXAMPLE VIII

One mole of malic acid (134 g.) was dissolved in 6 moles of propylene glycol (500 g.) by heating to 60° C. with agitation. When solution had been effected and the mixture blanketed by a stream of carbon dioxide one mole of a monoglyceride concentrate (360 g. of 90% monoester) was added. The glass reaction vessel was fitted with a thermometer and a reflux condenser and the stirred mixture was heated gradually until the temperature had reached about 180° C. After a reaction time of about 3 hours a small amount of distillate had passed through the condenser. The product was then cooled and the cooled reaction mixture after washing and removal of the wash water was deodorized under vacuum.

The molar ratio of reactants does not appear to be critical since satisfactory additives having good functional properties have been prepared from 1 mole citric acid, 1 mole monoglycerides, and from 1 to 7 moles of propylene glycol. Moreover the deodorization step may be varied considerably with respect to heating temperature and vacuum since it is well within the ability of one skilled in the art to suggest variations on this procedure. Since it has been found in the present instance that the temperature-pressure relationship reported is satisfactory in producing an odorless, tasteless product, it is unnecessary to employ higher temperatures which could conceivably cause polymerization.

Excellent results have been obtained by incorporating 2-4% based on the weight of the shortening of the above-noted additives where the shortening is employed in the production of a cream filler. Amounts of the additive from about 0.5%-10% based on the shortening weight show some activity and while 1-5% of the additive may be used, in many cases the above-noted preferred amount has been most satisfactory. The concentration range and the optimum functional concentration of the additive in the shortening will depend to a great degree upon the product being prepared. Cream fillers using different proportions of ingredients, layer cakes, pound cakes, etc., will require different amounts for optimum functionality. The adjustment of the most advisable range is well within the ability of those skilled in the art, however. Additionally it has been found that the additive prepared from a substantially pure monoester (90-99% monoester) is much more effective than a similar additive prepared from commercial monoglycerides (40-60% monoesters). Approximately twice as much as the additive will be required in the case of the composition prepared from the commercial monoglycerides as with that produced by substantially pure monoester for a given product.

Obviously, many modifications and variations of the invention as herein set forth may be made without departing from the spirit and scope thereof, and, therefore, only such limitations are to be imposed as are indicated in the appended claims.

I claim:

1. A shortening agent comprising a major amount of a glyceride material having shortening properties and a small amount sufficient to improve creaming properties in said shortening of the mixture produced by the reaction between an aliphatic hydroxy polycarboxylic acid, an aliphatic dihydric alcohol and monoglycerides.

2. An improved cream filler and icing shortening comprising: a shortening agent having shortening properties and a small amount sufficient to impart improved creaming and beating stability to said shortening of the product prepared by heating and reacting with removal of volatile substances equimolar amounts of an aliphatic hydroxy polycarboxylic acid, an aliphatic glycol and higher fatty acid monoglycerides.

3. A shortening agent comprising a major amount of a glyceride material having shortening properties and a minor amount sufficient to improve the creaming properties and cream filler functionality of said shortening of the reaction product of equimolar amounts of citric acid, propylene glycol and higher fatty acid monoglycerides.

4. The shortening agent of claim 3 wherein the fatty acid monoglyceride component contains more than 90% monoglycerides.

5. A cream filler having improved body and a smoother texture comprising a cream filler formula of sugar, milk and fat, the fat component of said cream filler comprising a shortening agent having shortening properties and about 0.5-10% of the reaction product of citric acid, propylene glycol and monoglycerides.

6. A method of preparing a shortening emulsifier which comprises: heating and reacting a mixture of citric acid, monoglycerides and propylene glycol with removal of volatile substances in an inert atmosphere at a temperature above about 100° C. but below the temperature at which polymerization occurs, cooling the reaction mixture and deodorizing the resulting product.

7. The method of claim 6 wherein the monoglyceride component contains 90-95% monoester.

8. A method of preparing a shortening additive which comprises: mixing and reacting by heat about 1 mol citric acid, about 1 mol monoglycerides, and about 1-7.2 mols propylene glycol in a carbon dioxide atmosphere at a temperature of about 100-180° C.

9. A method of preparing a shortening additive, said method comprising: the steps of heating citric acid and propylene glycol in an inert atmosphere, adding to the mixture monoglycerides and further heating to a temperature sufficient to volatilize water from the mixture but not substantially in excess of about 180° C., cooling the reaction mixture and deodorizing to remove volatile materials from said additive.

10. A method for preparing a shortening material adapted for use in the preparation of icings, cream fillers and the like comprising: embodying in a shortening material a minor amount of the reaction product derived from the heat induced reaction between citric acid, propylene glycol and monoglycerides.

11. A cream filler having improved body and a smoother texture comprising a cream filler formula of sugar, milk and fat, the fat component of said cream filler comprising a shortening agent having shortening properties and about 1-5% of the reaction product of citric acid, propylene glycol and monoglycerides.

12. A method for preparing a shortening emulsifier which comprises: reacting by heating to a temperature of around 100 to around 180° C. an aliphatic hydroxy polycarboxylic acid, a glycol, and monoglycerides and continuing said heating for a time sufficient to volatilize water from the reaction mixture.

13. The emulsifier prepared in accordance with the method of claim 12.

References Cited in the file of this patent

UNITED STATES PATENTS

| | | |
|---|---|---|
| 2,469,371 | Colbeth | May 10, 1949 |
| 2,690,971 | Iveson et al. | Oct. 5, 1954 |
| 2,758,931 | Hall | Aug. 14, 1956 |
| 2,786,765 | Prince | Nov. 21, 1957 |